F. H. RAGAN.
GEAR SHIFTING MECHANISM.
APPLICATION FILED JUNE 30, 1920. RENEWED SEPT. 11, 1922.

1,432,902.

Patented Oct. 24, 1922.
3 SHEETS—SHEET 1.

Inventor
Frederick H. Ragan

By Whittemore Hulbert & Whittemore
Attorneys

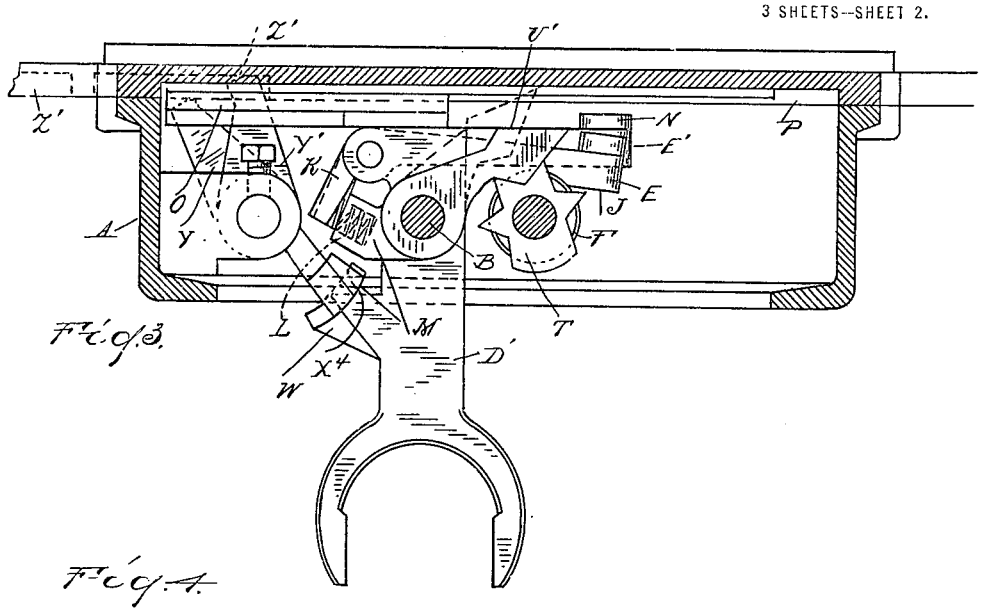
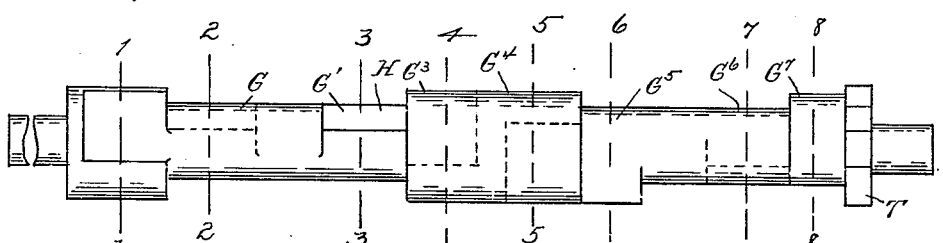
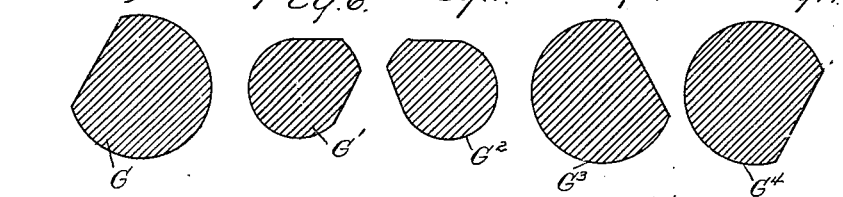
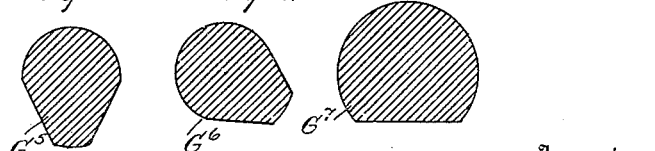

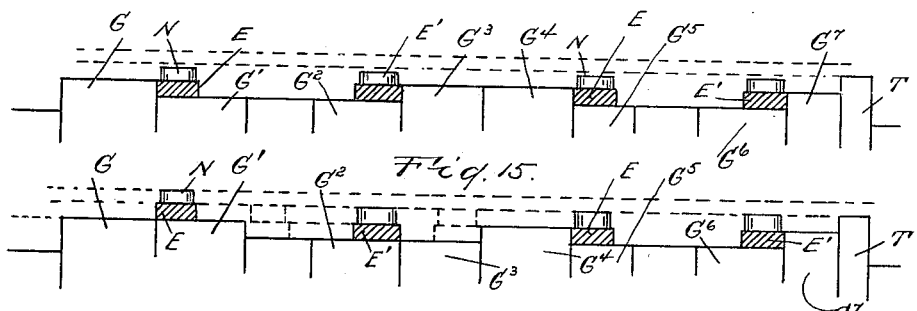
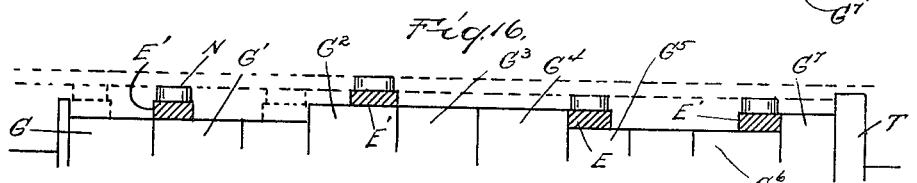
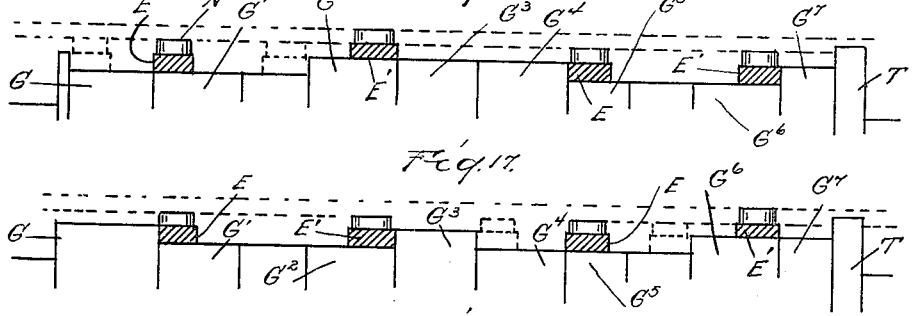
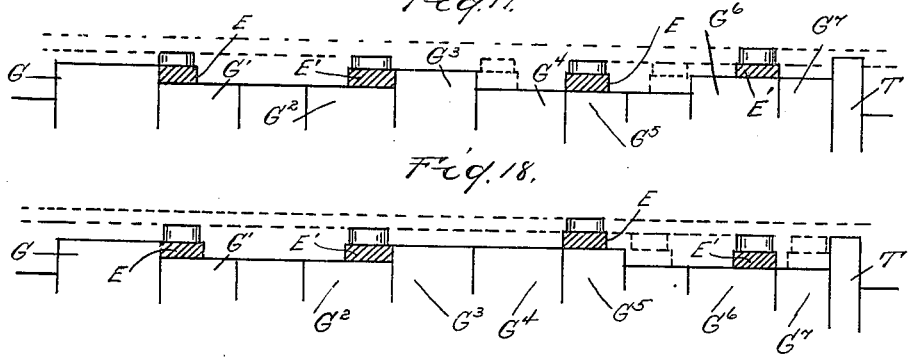
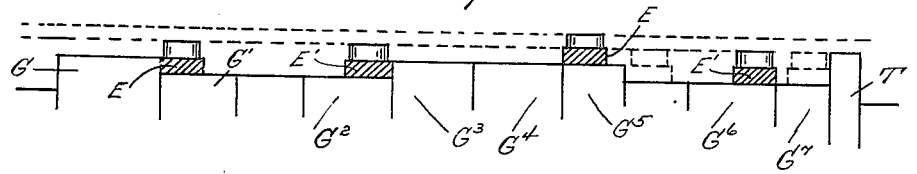
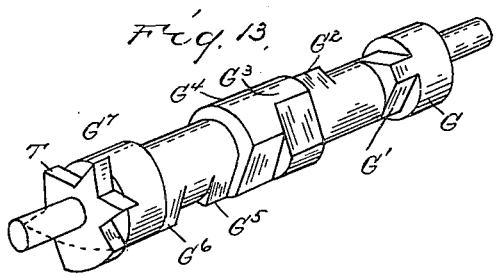

Patented Oct. 24, 1922.

1,432,902

UNITED STATES PATENT OFFICE.

FREDERICK H. RAGAN, OF CLEVELAND, OHIO.

GEAR-SHIFTING MECHANISM.

Application filed June 30, 1920, Serial No. 392,953. Renewed September 11, 1922. Serial No. 587,627.

*To all whom it may concern:*

Be it known that I, FREDERICK H. RAGAN, a citizen of the United States of America, residing at Cleveland, in the county of Cuyahoga and State of Ohio, have invented certain new and useful Improvements in Gear-Shifting Mechanism, of which the following is a specification, reference being had therein to the accompanying drawings.

The invention relates to gear-shifting mechanism of that type in which means is provided for first selecting the desired shift and subsequently actuating the mechanism for effecting the same. It is one of the objects of the invention to obtain a construction in which, after a selected shift has been performed, the mechanism is locked, and will remain locked until another shift is selected. It is a further object to obtain a simple mechanical construction, and one which is applicable to any standard construction of transmission gearing.

In the drawings:

Figure 3 is a section in a plane at right angles to Figure 2;

Figure 4 is a plan view of the selector cam shaft;

Figure 1:
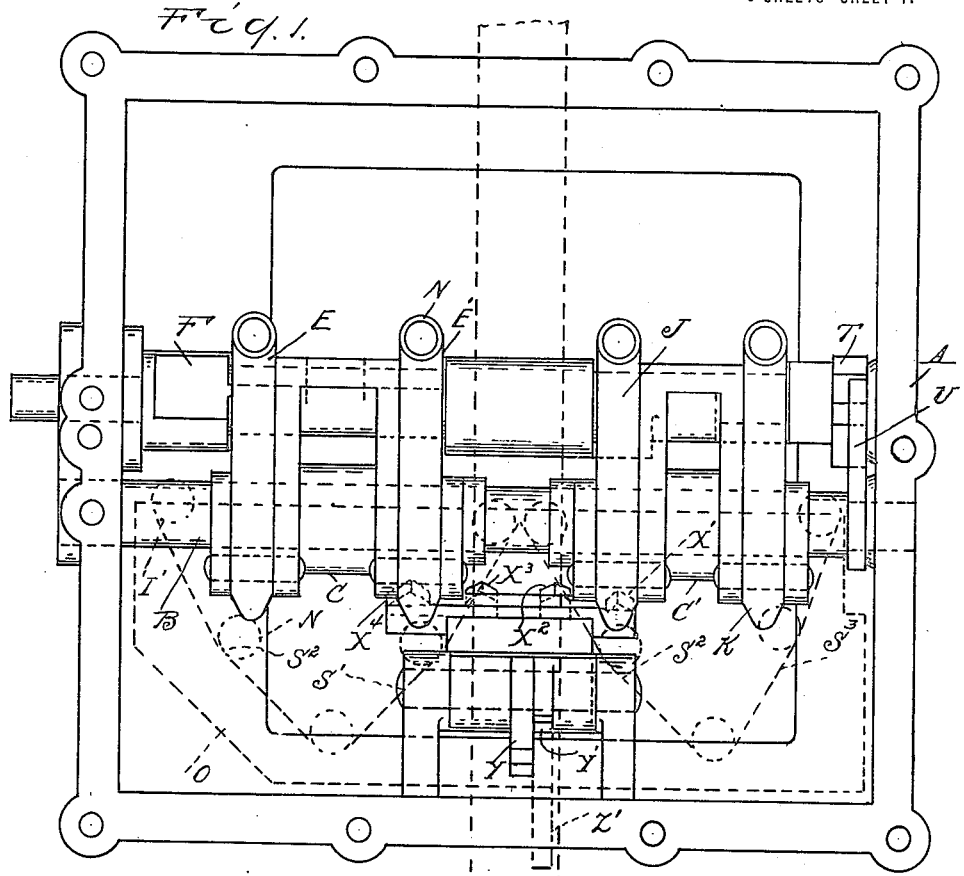
Figure 1 is a plan view of the gear-shifting mechanism with the cover of the case removed.
Figure 2:
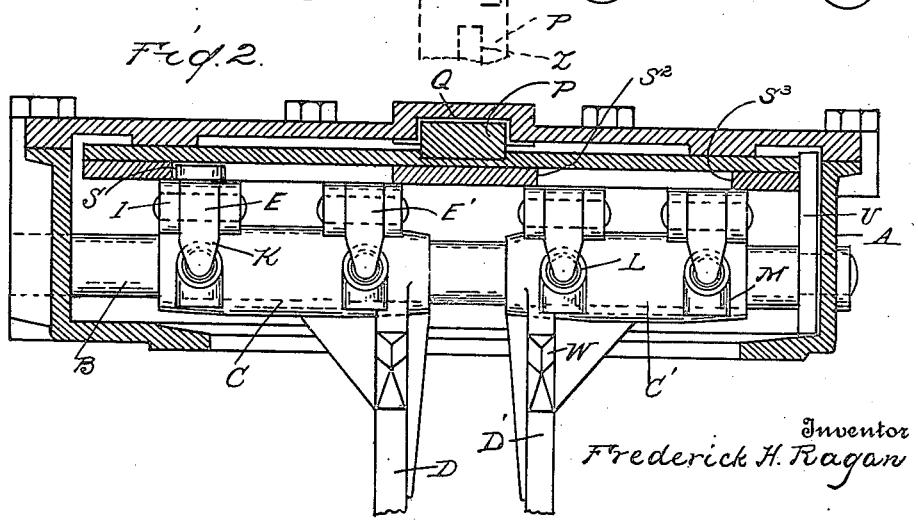
Figure 2 is a cross-section.

Figures 5 to 12 inclusive are cross-sections respectively on lines 1—1, 2—2, 3—3, 4—4, 5—5, 6—6, 7—7 and 8—8 of Figure 4;

Figure 13 is a perspective view of the selector cam shaft; and

Figures 14 to 18 inclusive are diagrammatic views showing the relative arrangement of the selector cam shaft and the connections between the shifters and the actuating mechanism.

In the standard construction of gear transmissions, such as used in connection with motor cars and for similar purposes, it is usual to provide a plurality of shifter forks slidable upon guides and having suitable engagement with the gears to be shifted. With my improved construction I utilize such shifters and provide means by which they are normally locked from movement, but are unlocked upon the operation of selective mechanism. Further, the selective mechanism is of such construction that only the desired shift is permitted, and upon the completion of the shifting movement the shifters are again automatically locked, remaining in this condition until a new selective act is performed. Thus where the actuating force is from a connection with the clutch pedal, the operation of the pedal in releasing or throwing in the clutch will have no effect upon the shifter mechanism unless there has been a previous act of selection. This has an obvious advantage over constructions in which the gears are neutralized each time the pedal is actuated.

In detail, A is the housing for the shifter mechanism, which is adapted for mounting upon the housing of the transmission gearing in place of the usual cap. B is a guide extending longitudinally of the housing A, upon which are slidably mounted the shifter heads C and C' provided with depending shifter forks D and D'. Sufficient clearance is provided between these heads and the housing for the necessary movement of the shifters from neutral to each of their operative positions. For operating the heads each is provided with a plurality of dogs E E', adapted for engagement with an actuating member, by which they may be moved in either of two opposite directions. The dogs are controlled by a selector, which comprises a cammed guide F arranged parallel to the guide B and engaging laterally-extending portions of the said dogs E and E'. The guide F also cooperates with the dogs E and E' to form the locking mechanism for holding the shifters from movement, and this is accomplished by the provision of a plurality of projecting cam portions G, G'—G⁷, each projection terminating in a shoulder H, which in one position of the cam will form a stop for limiting the movement of one of the dogs.

As specifically shown, the dogs E E', etc., are pivotally mounted between ears I upon the shifter heads C and C', and are provided with laterally-projecting portions J for engaging the selector F. They are also preferably provided with depending arms K which engage springs L housed in recessed lugs M upon the heads C and C', the arrangement being such that the tension of the springs will operate to press the laterally-extending arms J downward or towards the axis of the cammed guide F. N are anti-friction rolls mounted upon each of the arms J and adapted in the elevated position of the latter to engage the actuating member. The actuating member is arranged to be reciprocated transversely of the guide B, and preferably comprises a plate O slidably mounted in the upper portion of the housing A. The plate is attached to an actuating rod P guided in a groove Q in the cover of the housing, which rod extends beyond the housing and may be attached to the pedal by any suitable means (not shown). On the lower face of the plate O are cams S S' S², S³, so fashioned as to engage and actuate the rolls N of the dogs E E' when the latter are in their elevated positions. In the normal position of the plate the cams are withdrawn from contact with the rolls N, even where the latter are in a position for operation, and sufficient clearance or lost-motion is provided for the releasing of the clutch by its actuating pedal before engagement with the dogs takes place. Furthermore, the arrangement is such that the neutralizing movement of either one of the shifters will always take place in advance of any movement of the other shifter into an active position, thereby avoiding possibility of inter-locking the gears.

In specific construction the cams S S' S² S³ on the plate O form V-shaped recesses, the outer edge portions of which from points 1 to 2 are used for adjusting the shifters into active position. Thus, where the plate O is actuated by the rod P, its initial movement permits the releasing of the clutch. A further movement will effect the neutralization of the shifters (providing a previous act of selection has been performed), and the final portion of the movement will adjust the shifters to their selected positions.

As has been stated, the shifters are normally locked and out of operative relation to the actuating member, so that where there has been no previous act of selection the movement of the pedal and of the plate O will have no effect on the shifting mechanism. This is by reason of the fact that the dogs E and E' when in engagement with the shoulders H are sufficiently depressed to withdraw the rolls N from the path of the cams S S' etc. To adjust a dog into operative position, a rotation of the shaft F is required, this being accomplished by suitable connections (not shown) to the selective control. This rotation will cause one or more of the cams G, G'—G⁷ to raise their corresponding dogs out of engagement with the locking shoulders, thereby performing the double function of releasing the lock and adjusting the dog into operative relation to the actuating member. As specifically shown, there are five points of adjustment of the member F, including two active positions for each of the shifters and a neutral position. In each of these positions of adjustment the cams G, G'—G⁷, together with their shoulders H are so located as to allow the dogs E and E' to drop out of operative relation to the actuating member and into locking engagement with the shoulder. Also the construction is such that the selector F may be rotated from any position of adjustment to any other, the cams raising the dogs so that in the new position of adjustment freedom is provided for longitudinal movement with a re-locking at the completion of said movement. The re-locking is effected by opposed shoulders engaging opposite faces of the dogs E E', so that when either dog is released from its shoulder, movement is permitted in one direction. Furthermore, the amount of movement permitted is dependent upon the particular position selected and its relation to the previous position. Thus an adjustment from one of the active positions to the opposite position will permit substantially twice the amount of movement of the shifter that is possible where the adjustment is from neutral to active or from active to neutral. In each instance, one of the dogs is free from the shoulder by which it was previously locked and travels without obstruction to the shoulder in the new position of adjustment. The other dog is also free to travel, but at the completion of the movement drops into engagement with a new shoulder to re-lock the shifter.

Certainty in the operation of the mechanism requires full and complete movements in each adjustment, as otherwise the shifter might be left in a partially operated and unlocked position. It is unsafe to rely upon the operator to completely depress the pedal in each operation, and as an incomplete movement would leave the mechanisms disarranged, I have provided additional safety devices. In connection with the selector there is provided an indexing mechanism, which, as shown, consists of a notched wheel T at one end of the member F and cooperating dog U for engaging the notches of said wheel. The dog U has a projecting portion U', which extends into the path of the plate O, the arrangement being such that in the movement of said plate the projection U' will be forced downward, thereby entering the V-shaped ends of the dog U into a correspondingly-shaped notch of the wheel T. This will insure an exact angular movement of the rotary selector even where the actuating device therefor fails to complete the movement.

For insuring full and complete movement of the shifter heads C and C', these are provided with V-shaped projecting lugs W for cooperating with an indexing device X. The latter is preferably in the form of a rockable member having a plurality of V-shaped lugs X X' X², etc., with intermediate slots. The member X is mounted upon the housing A in such a position that when it is rocked upon its axis one or more of the V-shaped lugs X X², etc., will cooperate with the lugs W to compel complete movement of the shifter heads C and C' in each position of adjustment of the latter. The member X may be actuated by rock-arms Y and Y' projecting upward therefrom and engaging slots Z and Z' in the bar P, the arrangement being such that lost motion is provided for the movement of said bar in disengaging the clutch, after which the rock-arm Y' is actuated to rock the member X and disengage the lugs X X' X², etc., from the lugs W. This will permit movement of the shifters, but upon the return movement of the bar P the rock-arm Y will be actuated in the opposite direction, returning the member X to a position of engagement with the lugs W. In case the actuating movement is less than half that required, the operation of the member X will return the shifter to its original position where the dogs will re-lock. Thus there is a double locking of the device, first, by the dogs, and second, by the member X.

In operation when the shifter mechanism is in neutral position the relative arrangement, as shown in Figure 14, of the cam portions G, G'—G⁷ with their shoulders H and the dogs E and E' with their rolls N is such that the rolls N are out of the path of movement of the actuating member O, shown by the parallel dotted lines above the cam portions, and the dogs E and E' are locked between the opposed shoulders H on the cam portions G and G³ and G⁴ and G⁷. To shift the gears into first or low the selector cam shaft is rotated by suitable connections (not shown) whereby the cam portions G' raises the dog E so that the roll N is in the path of movement of the actuating member O, as shown in Figure 15. The cam portions G² and G³ are so arranged that in this position of the selector cam shaft they present a continuous surface over which the dog E' may slide. Upon sufficient movement of the actuating member O its cam S contacts with the roll N to move the same inwardly, thereby correspondingly moving the shifter D. Upon completion of its inward movement the dog E drops out of contact with the actuating member O and both of the dogs E and E' for the shifter D lock between the opposed shoulders H of the cam portions G' and G⁴, as shown by the dotted lines. Inasmuch as the roll N of the dog E for the shifter G was the only one in the path of movement of the actuating member the shifter D is the only one moved, the shifter D' remaining locked in the same position as shown in Figure 14. To shift the gears into reverse the selector cam shaft is rotated whereby the cam portion G² places the roll N of the dog E for the shifter D in the path of movement of the actuating member O as shown in Figure 16 and particularly in the path of the cam S' thereof, which moves the roll outwardly, thereby operating the shifter D correspondingly. Upon completion of its outward movement the dog E' drops out of contact with the actuating member O and both of the dogs E' and E for the shifter D lock between the opposed shoulders H of the cam portions G and G², as shown by the dotted lines. The dogs E and E' for the shifter D' remain locked in position.

To shift the gears into second or intermediate and third or high, the shifter D' is moved respectively inwardly and outwardly by means of the cams S³ and S² of the actuating member O, the dogs being locked at the completion of movement of the shifter and the shifter D remaining locked during these shifting operations, these operations being respectively shown in Figures 17 and 18.

The notched wheel T performs the additional function of serving as a locking shoulder for the dog E' of the shifter D' when the gears have been shifted to third or high, as shown by Figure 18.

If the gears are shifted into second or intermediate or into third or high from first or low the dogs E and E' for the shifter D occupy at the beginning of the shifting operation the positions shown by the dotted lines. Upon turning the selector cam shaft the dog E' for the shifter D is raised by the cam G³ so that upon sufficient movement of the actuating member O the dog E and the shifter D will be moved outwardly until the dogs E and E' for the shifter D lock in neutral position. During this movement of the actuating member the dogs for the shifter D' are moved to the selected position.

What I claim as my invention is:

1. In a gear shifting mechanism, the combination with a shifter and a guide therefor, of an actuating member for said shifter reciprocable transversely of said guide, normally disconnected therefrom, a rotatable selector for placing said shifter and actuating member in cooperating relation, and automatic means operating on the completion of the shifting movement for disengaging the shifter from its actuating device and for locking the same on its guide.

2. In a gear shifting mechanism, the combination with a shifter and a guide therefor, of an actuating device normally out of operative relation to said shifter, a selector and a plurality of dogs actuated by said selector for placing said actuating member and shifter in operative relation and for automatically disengaging and locking said shifter at the completion of its movement.

3. In a gear shifting mechanism, the combination with a shifter and a guide therefor, of an actuating member, a rotatble selector, and means for normally locking said shifter to said selector and for alternatively effecting an operative relation to said actuating member, operated by a predetermined adjustment of said selector, said means automatically disengaging and re-locking upon the completion of the shifting movement.

4. In a gear shifting mechanism, the combination with a shifter and a guide therefor, of an actuating member, a rotatable selector, means actuated by said selector for effecting an operative relation between said shifter and said actuating member, said means automatically disengaging said shifter from said actuating member at the completion of the shifting movement.

5. In a gear shifting mechanism, the combination with a shifter and a guide therefor, of actuating means for moving said shifter in opposite directions upon said guide, a selector provided with a plurality of cams, means engaging the cams of said selector for normally locking said shifter from movement on its guide, adapted to be released by a predetermined operation of said selector, said means automatically re-locking upon the completion of the shifting movement.

6. In a gear shifting mechanism, the combination with a shifter and a guide therefor, of an actuating member for moving said shifter in opposite directions upon its guide, means for alternatively locking said shifter from movement on its guide and for placing said shifter in operative relation to said actuating member, and a rotatable selector for controlling said alternatives.

7. In a gear shifting mechanism, the combination with a shifter, of a guide therefor, an actuating member for moving said shifter in opposite directions on said guide, means for alternatively locking said shifter and for placing the same in operative relation for movement by said actuating means, and a rotatable selector for controlling said alternatives, and for further determining the direction of movement.

8. In a gear shifting mechanism, the combination with a shifter and a guide therefor, of an actuating member for moving said shifter in opposite directions upon its guide, dogs for normally locking said shifter and for alternatively coupling the same to said actuating means for one or the other of the two direction movements, and a cammed selector for operating said dogs.

9. In a gear shifting mechanism, the combination with a shifter and a guide therefor, of an actuating member for moving said shifter on its guide in opposite directions, being normally out of operative relation, a dog for coupling with said actuating member for each of the opposite directions of movement, said dogs normally locking said shifter from movement, and a rotatable cammed selector for holding said dogs in operative position during an actuating movement, adapted to release the same at the completion of said movement.

10. In a gear shifting mechanism, the combination with a shifter and a guide therefor, of means for normally locking said shifter from movement, an actuating member for moving said shifter on its guide in opposite directions, and a rotatable selector for releasing said locking means and for effecting a coupling with said actuating member for a predetermined movement of said shifter, permitting the automatic disengagement from said actuating means and re-locking of the shifter at the completion of said movement.

11. In a gear shifting mechanism, the combination with a shifter and a guide therefor, of an actuating member for moving said shifter in opposite directions upon said guide, normally out of operative relation thereto, and a rotatable selector adapted to effect an operative relation between said actuating member and shifter for a predetermined direction of movement and to automatically release engagement at the completion of said movement.

12. In a gear shifting mechanism, the combination with a shifter and a guide therefor, of means for normally locking said shifter from movement on its guide, an actuating member adapted for movement of said shifter in opposite directions upon its guide, and a rotatable selector for releasing said locking means and for establishing operative relation with said actuating means for a predetermined direction of shift, said means permitting the re-locking and dis-engagement of said shifter from said actuating means at the completion of said predetermined movement.

13. In a gear shifting mechanism, the combination with a shifter and a guide therefor, of means for normally locking said shifter from movement on its guide, an actuating member normally disconnected from said shifter and having cammed portions for actuating the same in opposite directions when in operative relation, and a selector for unlocking said shifter and for effecting an operative relation of the same to one of the portions of said actuating member, said means permitting the automatic disengagement and re-locking of said shifter on the completion of its movement.

14. In a gear shifting mechanism, the combination with a shifter and a guide therefor, of an actuating member for moving said shifter on its guide in opposite directions, normally out of operative relation thereto, a rotative cammed guide parallel to said shifter guide, and a dog extending from said shifter to said cammed guide, adapted to be actuated thereby.

15. In a gear shifting mechanism, the combination with a shifter and a guide on which said shifter is longitudinally movable, of an actuating member movable transversely of said guide, having oppositely cammed portions, a plurality of dogs on said shifter for cooperating respectively with the oppositely-cammed portions of said actuating member but normally out of the path of movement thereof, and a selector for alternatively adjusting said dogs into operative relation to their respective cams.

16. In a gear shifting mechanism, the combination with a shifter, of a guide on which said shifter is longitudinally movable, an actuating member movable transversely of said guide and provided with oppositely cammed portions, a plurality of dogs on said shifter for cooperating respectively with said oppositely-cammed portions to move said shifter in opposite directions upon its guide, said dogs being normally out of the path of movement of said actuating member, and a selector normally engaging said dogs to lock said shifter from movement, adapted to alternatively adjust said dogs into operative relation to their respective cams and thereby permitting a predetermined limited movement of the shifter.

17. In a gear shifting mechanism, the combination with a shifter and a guide along which said shifter is longitudinally movable, of a plurality of dogs carried by said shifter, an actuating member movable transversely of said guide and having portions for respectively cooperating with said dogs to move said shifter in opposite directions upon its guide, and a selective member in engagement with said dogs for locking and releasing the same, adapted during the releasing movement to alternatively adjust dogs into operative relation with said actuating member.

18. In a gear shifting mechanism, the combination with a plurality of shifters and a guide along which said shifters are independently longitudinally adjustable, of a plurality of dogs carried by each shifter an actuating member movable transversely of said guide having portions for cooperating with the respective dogs to move each shifter in opposite directions, and a selector member engaging said dogs to normally hold the same out of operative relation with said actuating member and to lock said shifters from movement, said selector being adapted to alternatively adjust said dogs into operative relation with said actuating member and thereby release the shifters for longitudinal adjustment.

19. In a gear shifting mechanism, the combination with a shifter and a guide along which said shifter is longitudinally adjustable, of an actuating member for said shifter arranged to reciprocate transversely of said guide, a dog on said shifter, and a selector, comprising a member parallel to said guide, longitudinally fixed and rotatively adjustable, said member having a series of cams thereon operated by the rotative movement thereof to adjust said dog into operative relation to said actuating member, and shoulders for locking said dog at the completion of its movement.

20. In a gear shifting mechanism, the combination with a shifter and a guide along which said shifter is longitudinally adjustable, of an actuating member reciprocating transversely of said guide and having cammed portions for moving said shifter in opposite directions, a pair of dogs on said shifter for engaging the respective portions of said actuating member, and a selector longitudinally fixed and rotatively adjustable, having shoulders for locking said dogs, and cams for alternatively releasing said dogs and adjusting the same into operative relation to said actuating member.

21. In a gear shifting mechanism, the combination with a pair of independently operable shifters, of a guide along which said shifters are longitudinally adjustable, an actuating member arranged to reciprocate transversely of said guide and provided with cammed portions for actuating said shifters in opposite directions, the portions of said cams for moving the shifters from an active to a neutral position being in advance of the portions for moving said shifters from a neutral to an active position, a pair of dogs on each shifter for cooperating respectively with said cams, and a selector arranged parallel to said guide longitudinally fixed and rotatively adjustable, said selector having stops or shoulders for engaging with said dogs to lock the shifters from movement, and cams for disengaging said dogs from their locking shoulders and simultaneously adjusting the same into operative relation with said actuating member.

22. In a gear shifting mechanism, the combination with a casing, of a guide extending thereacross, a plurality of shifters mounted on said guide and longitudinally adjustable thereon, in opposite directions, an actuating member mounted for reciprocation transversely of said guide and provided with cammed portions for actuating each of said shifters in opposite directions, a pair of dogs on each shifter for engagement with the respective cams of said actuating member, and a selector comprising a cammed member parallel to said guide, longitudinally fixed and rotatively adjustable, the cams on said member being adapted to adjust the respective dogs into operative relation to said actuating member and also providing locking shoulders for said dogs when in released position.

23. In a gear shifting mechanism, the combination with a casing, of a guide extending thereacross, a plurality of shifters longitudinally slidable upon said guide, an actuating member in the form of a plate slidable transversely of said guide and having cammed portions for actuating each of said shifters in opposite directions, a pair of dogs on each shifter, and a selector comprising a rotative cam-shaft parallel to said guide and engaging said dogs, the cams on said shaft being adapted to respectively adjust said dogs into operative relation with their respective cams on the actuating member and also providing stops for locking said dogs when in released position.

24. In a gear shifting mechanism, the combination with a casing, of a guide extending thereacross, a plurality of shifters longitudinally slidable upon said guide, an actuating member movable transversely of said guide and provided with cammed portions for actuating each of said shifters in opposite directions, a pair of dogs on each shifter for engagement with the respective cammed portions of said actuating member, a selector for adjusting said dogs into operative engagement with said actuating member and engaging with said shifters to insure exact positions of adjustment.

25. In a gear shifting mechanism, the combination with a casing, of a guide extending thereacross, a shifter slidable on said guide, an actuating member slidable transversely of said guide and having cammed portions for actuating said shifter for engaging said actuating member, a rotative selector for actuating said dog, and an indexing device for determining exact positions of adjustment of said selector.

26. In a gear shifting mechanism, the combination with a shifter and a guide therefor, of an actuating device normally out of operative relation to said shifter, a selector, means actuated by said selector for placing said actuating device and shifter in operative relation, and means actuated by said actuating device for insuring exact positions of adjustment of said shifter.

27. In a gear shifting mechanism, the combination with a shifter and a guide therefor, of an actuating device normally out of operative relation to said shifter, a selector, means actuated by said selector for placing said actuating device and shifter in operative relation, and means actuated by said actuating device for insuring exact position of adjustment of said selector.

28. In a gear shifting mechanism, the combination with a shifter and a guide therefor, of an actuating device, normally out of operative relation to said shifter, a selector, means actuated by said selector for placing said actuating device and shifter in operative relation and means actuated by said actuating device for insuring exact position of adjustment of said selector and shifter.

29. In a gear shifting mechanism, the combination with a shifter, of an actuating device normally out of operative relation to said shifter, and a selector provided with means for placing said actuating device in operative relation with said shifter, permitting of the continuous movement of said shifter alternatively to a plurality of adjustments through an intermediate position and locking said shifter in its position of adjustment.

30. In a gear shifting mechanism, the combination with a shifter and a plurality of dogs connected thereto, of an actuating device, and a rotative selector member engaging said dogs, provided with a series of cammed portions terminating in shoulders for placing said dogs and actuating device in operative relation, said actuating device being provided with portions for moving said dogs longitudinally over a plurality of said cammed portions, the surfaces of the latter over which said dogs move being continuous to permit of the continuous movement of said dogs to a plurality of alternative adjustments through an intermediate position depending upon the rotative adjustment of said selector member, said dogs upon the completion of their movement being locked between said shoulders of the cam portions.

31. In a gear-shifting mechanism, the combination with a shifter, of an actuating device for operating the same to a plurality of different positions, and indexing means actuated by said actuating device for compelling exact positions of adjustment.

32. In a gear-shifting mechanism, the combination with a shifter, of means for actuating the same, a selector having a plurality of positions, and indexing means for compelling exact positions of adjustment of said selector, operated by said actuating means in advance of the operation thereby of said shifter.

In testimony whereof I affix my signature.

FREDERICK H. RAGAN.